(12) United States Patent
Krishna et al.

(10) Patent No.: US 8,644,339 B1
(45) Date of Patent: Feb. 4, 2014

(54) IN-LINE PACKET REASSEMBLY WITHIN A MOBILE GATEWAY

(75) Inventors: Gopi Krishna, Tracy, CA (US); Abbas Sakarwala, Sunnyvale, CA (US); Pankaj Kumar Gupta, Bangalore (IN); Prabhakaran Ganesan, Fremont, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 128 days.

(21) Appl. No.: 13/426,299

(22) Filed: Mar. 21, 2012

Related U.S. Application Data (60) Provisional application No. 61/565,744, filed on Dec. 1, 2011.

(51) Int. Cl.
*H04J 3/24* (2006.01)

(52) U.S. Cl.
USPC .......................................... 370/471; 370/474

(58) Field of Classification Search
USPC ......... 370/349, 379, 382, 383, 389, 471, 473, 370/474
See application file for complete search history.

(56) References Cited

U.S. PATENT DOCUMENTS

| | | | |
|---|---|---|---|
| 6,909,713 B2 * | 6/2005 | Magnussen et al. | 370/389 |
| 7,835,356 B2 * | 11/2010 | Bar-Kovetz et al. | 370/389 |
| 2008/0044181 A1 | 2/2008 | Sindhu | |

OTHER PUBLICATIONS

U.S. Appl. No. 13/172,556, by Apurva Mehta, filed Jun. 29, 2011.
U.S. Appl. No. 13/248,834, by Srinivasa Chaganti, filed Sep. 29, 2011.
U.S. Appl. No. 12/905,771, by Venkatesh Badakere Ramachandra, filed Oct. 15, 2010.
U.S. Appl. No. 12/182,619, by Jerome P. Moisand, filed Jul. 30, 2008.
U.S. Appl. No. 13/172,505, by Andrzej Szyszko, filed Jun. 29, 2011.
"3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, Jun. 2010, 261 pp.
"3GPP TS 36.300—Evolved Universal Terrestrial Radio Access (E-UTRA) and Evolved Universal Terrestrial Radio Access Network (E-UTRAN)," Release 10, 3rd Generation Partnership Project, Technical Specification Group Radio Access Network, Jun. 2010, 183 pp.

\* cited by examiner

*Primary Examiner* — Brenda H Pham
(74) *Attorney, Agent, or Firm* — Shumaker & Sieffert, P.A.

(57) ABSTRACT

In one example, a serving gateway device includes one or more network interfaces configured to receive a packet fragment from a packet data network gateway (PGW) device, and a control unit configured to hash a source Internet protocol (IP) address, a destination IP address, and a fragment identifier value for the packet fragment to determine an entry of a hash table, wherein the entry of the hash table includes data defining a next expected offset, a next expected fragment identifier, and a reference to a fragment table comprising data for at least one previous packet fragment corresponding to the packet fragment, to compare a length of the packet fragment to the next expected offset and the fragment identifier value for the packet fragment to the next expected fragment identifier, and store the packet fragment using the fragment table based on the comparison.

34 Claims, 6 Drawing Sheets

IN-LINE PACKET REASSEMBLY WITHIN A MOBILE GATEWAY

This application claims the benefit of U.S. Provisional Application No. 61/565,744, filed Dec. 1, 2011, which is hereby incorporated by reference in its entirety.

TECHNICAL FIELD

This disclosure relates to mobile networks and, more specifically, to handling subscriber traffic within mobile networks.

BACKGROUND

A cellular radio access network is a collection of cells that each includes at least one base station capable of transmitting and relaying signals to subscribers' wireless devices. A "cell" generally denotes a distinct area of a mobile network that utilizes a particular frequency or range of frequencies for transmission of data. A typical base station is a tower, to which a number of antennas are affixed, and the antennas transmit and receive the data over the particular frequency. Wireless devices, such as cellular or mobile phones, smart phones, camera phones, personal digital assistants (PDAs) and laptop computers, may initiate or otherwise transmit a signal at the particular frequency to the base station to initiate a call or data session and begin transmitting data.

Mobile service provider networks convert cellular signals, e.g., Time Division Multiple Access (TDMA) signals, Orthogonal Frequency-Division Multiplexing (OFDM) signals or Code Division Multiple Access (CDMA) signals, received at a base station from wireless devices into Internet protocol (IP) packets for transmission within packet-based networks. A number of standards have been proposed to facilitate this conversion and transmission of cellular signals to IP packets, such as a general packet radio service (GPRS) standardized by the Global System for Mobile Communications (GSM) Association, a Universal Mobile Telecommunications System (UMTS) architecture, an enhancement of UMTS referred to as Long Term Evolution (LTE), mobile IP standardized by the Internet Engineering Task Force (IETF), as well as other standards proposed by the $3^{rd}$ Generation Partnership Project (3GPP), $3^{rd}$ Generation Partnership Project 2 (3GPP/2) and the Worldwide Interoperability for Microwave Access (WiMAX) forum.

A typical 3GPP mobile service provider network, or mobile network, includes a core packet-switched network, a transport network, and one or more radio access networks. The core packet-switched network for the mobile network uses a variety of control protocols to authenticate users and establish logical connections, known as bearers, among the many service nodes on a path between a wireless device, attached to one of the radio access networks, and a packet data network (PDN). The service nodes then utilize the bearers, which employ data protocols, to transport subscriber traffic exchanged between the wireless device and the PDN, which may include, for example, the Internet, an enterprise intranet, a layer 3 VPN, and a service provider's private network. Various PDNs provide a variety of packet-based services to wireless devices to enable the wireless devices to exchange service data with application or other servers of the PDNs.

In many cases, packets sent downlink from a PDN gateway (PGW) device to a serving gateway (SGW) device become fragmented. That is, the PGW device typically sends packets to the SGW device via a network tunnel, such as an Internet protocol (IP), user datagram protocol (UDP), or GPRS tunnel. In order to tunnel the packets, the PGW encapsulates the packets with an additional header corresponding to the tunnel, which can cause the packet to exceed the maximum transmission unit (MTU) size of an S5 interface, that is, an interface between the PGW device and the SGW device. When encapsulation of a packet would cause the encapsulated to exceed the MTU size, the packet is fragmented, i.e., split into multiple packet fragments that are communicated separately, thereby remaining within the bounds of the MTU size.

Such fragmentation may result in loss of identifying information for the fragments during transit of the fragments. That is, in many cases, outer packet fragmentation occurs, which leads to fragmentation of tunnel headers for the fragmented packets. The tunnel header corresponds to a tunnel between a mobile device and a mobile gateway. Accordingly, the fragments must be reassembled at the SGW device, in order to recover the tunnel header. Reassembly of the packets is typically performed by multithreaded software operations in the control plane that consume significant processing resources of a control plane processor on the SGW. In some examples, a processor of the SGW device includes the capability to execute 24 threads, and three of the 24 threads may be devoted to reassembly of fragmented packets.

SUMMARY

In general, this disclosure describes techniques for in-line reassembly of packets, e.g., for a mobile device network. These techniques may be performed by a serving gateway (SGW) device. In particular, this disclosure provides techniques for performing reassembly of packets by hardware elements in a data plane, rather than tasking the control plane processor with reassembly of packets. Thus, packets may be reassembled by hardware units in the data plane (also referred to as the forwarding plane) rather than the control plane processor.

The SGW may receive packet fragments from a PDN gateway (PGW) device and use the techniques of this disclosure to reassemble the packet fragments to recover a tunnel header to determine identifying information for devices that are communicating using the packets. Although certain header information for the packet corresponding to the fragments is not necessarily available, the fragments each generally include a source Internet protocol (IP) address, a destination IP address, and an IP identifier, specified in headers for the fragments. The in-line packet reassembly techniques include hashing received fragments based on the source IP address, destination IP address, and IP identifier. The result of this hash function is used to select a table for storing fragments of a corresponding IP packet for reassembly. In the average case, such in-line packet reassembly provides on the order of 30 times improvement in processing efficiency.

In one example, a method includes receiving, by a first network device, e.g., a serving gateway (SGW) device, a packet fragment from a second network device, e.g., a packet data network gateway (PGW) device, hashing a source Internet protocol (IP) address, a destination IP address, and a fragment identifier value for the packet fragment to determine an entry of a hash table, wherein the entry of the hash table includes data defining a next expected offset, a next expected fragment identifier, and a reference to a fragment table comprising data for at least one previous packet fragment corresponding to the packet fragment, comparing a length of the packet fragment to the next expected offset and the fragment identifier value for the packet fragment to the next expected fragment identifier, and storing the packet fragment using the fragment table based on the comparison.

In another example, a network device, e.g., a serving gateway (SGW) device includes one or more network interfaces configured to receive a packet fragment from a second network device, e.g., a packet data network gateway (PGW) device, and a control unit configured to hash a source Internet protocol (IP) address, a destination IP address, and a fragment identifier value for the packet fragment to determine an entry of a hash table, wherein the entry of the hash table includes data defining a next expected offset, a next expected fragment identifier, and a reference to a fragment table comprising data for at least one previous packet fragment corresponding to the packet fragment, to compare a length of the packet fragment to the next expected offset and the fragment identifier value for the packet fragment to the next expected fragment identifier, and store the packet fragment using the fragment table based on the comparison.

In another example, a computer-readable storage medium includes instructions that, when executed, cause a programmable processor of a network device, e.g., a serving gateway (SGW) device, to receive a packet fragment from a packet data network gateway (PGW) device, hash a source Internet protocol (IP) address, a destination IP address, and a fragment identifier value for the packet fragment to determine an entry of a hash table, wherein the entry of the hash table includes data defining a next expected offset, a next expected fragment identifier, and a reference to a fragment table comprising data for at least one previous packet fragment corresponding to the packet fragment, compare a length of the packet fragment to the next expected offset and the fragment identifier value for the packet fragment to the next expected fragment identifier, and store the packet fragment using the fragment table based on the comparison.

In another example, a system includes a first network device, e.g., a packet data network gateway (PGW) device, and a second network device, e.g., a serving gateway (SGW) device communicatively coupled to the PGW device via a communicative interface. The PGW device is configured to fragment a packet when the packet would exceed a maximum transmission unit size associated with the communicative interface, and the SGW device is configured to receive a packet fragment from the PGW device, hash a source Internet protocol (IP) address, a destination IP address, and a fragment identifier value for the packet fragment to determine an entry of a hash table, wherein the entry of the hash table includes data defining a next expected offset, a next expected fragment identifier, and a reference to a fragment table comprising data for at least one previous packet fragment corresponding to the packet fragment, compare a length of the packet fragment to the next expected offset and the fragment identifier value for the packet fragment to the next expected fragment identifier, and store the packet fragment using the fragment table based on the comparison.

The details of one or more examples are set forth in the accompanying drawings and the description below. Other features, objects, and advantages will be apparent from the description and drawings, and from the claims.

DETAILED DESCRIPTION

Figure 1:
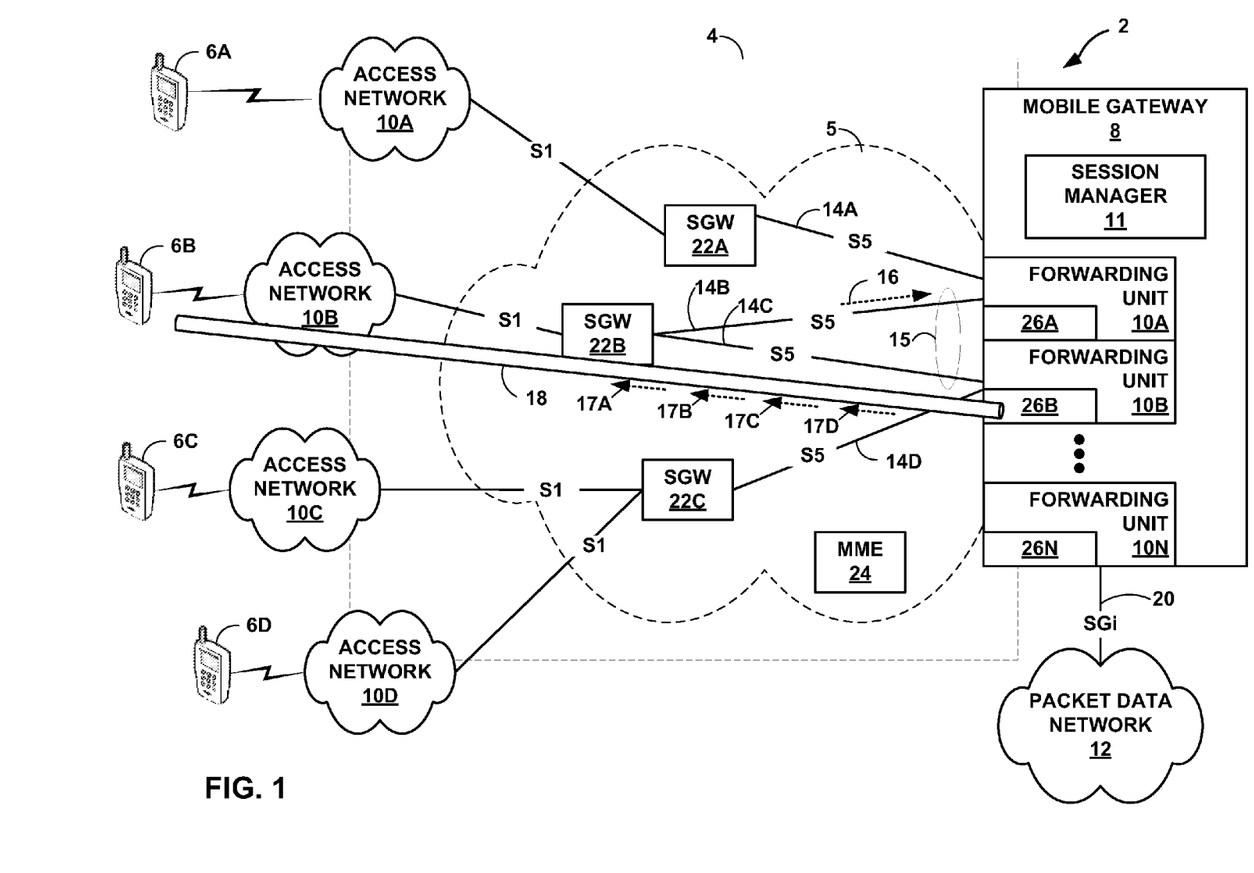
FIG. 1 is a block diagram illustrating an example network system in which a serving gateway device performs in-line packet reassembly according to the techniques described herein.

FIG. 1 is a block diagram illustrating an example network system in which a serving gateway device performs in-line packet reassembly according to the techniques described herein. In this example, network system 2 includes packet data network (PDN) 12 that exchanges traffic with mobile service provider network 4 ("SP network 4") using an SGi interface (or "reference point") with mobile gateway 8 operating over communication link 20. Packet data network 12 supports one or more packet-based services that are available for request and use by wireless devices 6A-6D ("wireless devices 6"). As examples, PDN 12 may provide bulk data delivery, voice over Internet protocol (VoIP), Internet Protocol television (IPTV), Short Messaging Service (SMS), Wireless Application Protocol (WAP) service, or customer-specific application services. Packet data network 12 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the mobile service provider that operates SP network 4, an enterprise IP network, or some combination thereof. In various examples, PDN 12 is connected to a public WAN, the Internet, or to other networks. Packet data network 12 executes one or more packet data protocols (PDPs), such as IP (IPv4 and/or IPv6), X.25 or Point-to-Point Protocol (PPP), to enable packet-based transport of PDN 12 services.

Each of wireless devices 6 is a wireless communication device for a subscriber (alternatively, a "subscriber device" or "mobile device") and may represent, for example, a mobile telephone, a laptop or desktop computer having, e.g., a 3G/4G wireless card, a wireless-capable netbook, a video game device, a pager, a smart phone, a personal data assistant (PDA), or other such devices. Each of wireless devices 6 may execute one or more applications, such as VoIP clients, video games, videoconferencing, E-mail, and Internet browsers, among others. Certain applications running on wireless device 6 may require access to services offered by PDN 12, such as Internet browsers that require access to the Internet. Wireless devices 6 may also be referred to as User Equipment (UE) or Mobile Stations (MS) and may alternatively be referred to herein as mobile devices.

Mobile service provider network 4, in this example, is a Long Term Evolution (LTE) network that includes an Evolved Packet Core (EPC) network 5 ("core network 5"). Core network 5 is interfaced to access networks 10A-10D, which in this example each represent an Evolved UTRAN (E-UTRAN). SP network 4 enables and transports service data exchanged between wireless device 6 and PDN 12. While illustrated and described with respect to a particular mobile service provider network architecture (an LTE network), SP network 4 may represent any type of content access network that provides network access, data transport and other services to wireless devices 6 communicatively coupled to SP network 4.

In general, SP network 4 may implement any commonly defined cellular network architecture including those defined by standards bodies, such as a Global System for Mobile communication (GSM) Association, a $3^{rd}$ Generation Partnership Project (3GPP), a $3^{rd}$ Generation Partnership Project 2 (3GPP/2), an Internet Engineering Task Force (IETF) and a Worldwide Interoperability for Microwave Access (WiMAX) forum. For example, SP network 4 may implement one or more of a GSM architecture, a General Packet Radio Service (GPRS) architecture, a Universal Mobile Telecommunications System (UMTS) architecture, and an evolution of UMTS referred to as Long Term Evolution (LTE), each of which are standardized by 3GPP. Mobile service provider network 4 may, alternatively or in conjunction with one of the above, implement a Code Division Multiple Access-2000 ("CDMA2000") or Enhanced Data Rates for GSM Evolution (EDGE) architecture. Mobile service provider network 4 may, again as an alternative or in conjunction with one or more of the above, implement a WiMAX architecture defined by the WiMAX forum. Mobile service provider network 4 may be alternatively referred to herein as a content access network (CAN).

Mobile service provider network 4 provides mobility management, session management, and packet routing and transfer for network system 2. Mobile service provider network 4 establishes and operates bearers to transport user traffic, in the form of PDP packet data units (PDUs), referred to hereinafter as "packets." In general, a bearer is a set of network resources and data transport functions in SP network 4 to deliver user traffic between two network entities. A bearer may include a path, a logical connection, or a physical or wireless connection between two network devices. A bearer may include, for example, an Evolved Packet System (EPS) bearer. Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each of which are hereby incorporated by reference.

Core network 5 of SP network 4 includes mobile gateway 8 logically connected to each of Serving Gateways (SGWs) 22 via S5 interfaces (or "reference points") operating over respective communication links 14A-14D. Mobile gateway 8 is an edge router between mobile SP network 4 and external PDNs, e.g., PDN 12, and hosts packet filtering, lawful interception, and PDP address allocation, among other functionality. As a router, mobile gateway 8 also executes routing protocols to identify routes through SP network 4 or PDN 12 to various destinations.

The S5 interfaces provide protocols to facilitate user plane tunneling and tunnel management between mobile gateway 8 and SGWs 22. The S5 interfaces may implement a user plane protocol stack that includes GPRS Tunneling Protocol-User Plane (GTP-U) executing over User Datagram Protocol/Internet Protocol (UDP/IP). The term "communication link," as used herein, includes any form of transport medium, wired or wireless, and can include intermediate nodes such as network devices. SGWs 22 host mobility anchoring, packet routing and forwarding, lawful interception, and other functionality.

Core network 5 additionally includes Mobility Management Entity (MME) 24 logically connected to SGWs 22 via S11 interfaces (not shown in FIG. 1, for ease of illustration). The S11 interface provides protocols with which MME 24 establishes and manages bearers that traverse or terminate at SGWs 22. The S11 interface may implement a control plane protocol stack that includes GTP-Control Plane (GTP-C) executing over UDP/IP. In addition to bearer management and establishment, MME 24 hosts Non-Access Stratum (NAS) signaling, mobile gateway 8 and SGW 22 selection, roaming, and authentication, for instance. In various examples, core network 5 includes different numbers of MMEs, SGWs, and/or PGWs. In different architectures of SP network 4, such as a UTRAN network, Serving GPRS Serving Nodes (SGSNs) may perform the functionality of SGWs 22 and MME 24, and a Gateway GPRS Serving Node (GGSN) may perform functionality of mobile gateway 8 consistent with the techniques of this disclosure. While described with respect to a particular type of LTE node, i.e., a PGW, the techniques are applicable to other types of core network gateways, including GGSNs, SGSNs, aGWs, and SGWs.

SGWs 22 and MME 24 connect to access networks 10 (e.g., U-TRANs) via respective aspects of an S1 interface. Specifically, SGWs 22 logically connect to individual access networks 10 via an S1-U interface operating over a communication link, and MME 24 logically connects to individual access networks 10 via an S1-MME interface operating over a communication link to establish bearers over the S1-U interface between SGWs 22 and access networks 10. Each of access networks 10 may be a radio access network, which in various instances may be a GSM Radio Access Network (GRAN), a WiMAX radio access network, a UMTS Terrestrial Radio Access Network (UTRAN), and/or an evolution of a UTRAN for LTE networks known as an E-UTRAN. Each of access networks 10 may include one or more radio towers, which in the case of E-UTRANs are eNode Bs and in the case of UMTS RANs are Node Bs. Wireless devices 6 communicatively couple to access networks 10 using a Uu interface operating over a radio link in this example.

Mobile service provider network 4 may further include a backhaul or transport network (not shown) that includes land-based transmission lines, frequently leased by a service provider, to transport user and control traffic between wireless devices 6 and mobile gateway 8. The backhaul network also includes network devices such as aggregation devices and routers. Further details of an example content access network for a mobile network are described in U.S. patent application Ser. No. 12/905,771, entitled "COLLECTIVELY ADDRESSING WIRELESS DEVICES," filed Oct. 15, 2010, the entire contents of which are hereby incorporated by reference.

In the illustrated example, mobile gateway 8 represents a PDN Gateway (PGW). However, in various other architectural examples of SP network 4, mobile gateway 8 may represent a Gateway GPRS Serving Node (GGSN) or an Access Gateway (aGW). Mobile gateway 8 may present a uniform interface to downstream nodes, including SGWs 22 and MME 24, to allow the downstream nodes to address subscriber service and/or signaling traffic to the uniform interface rather than separately directing such traffic among multiple devices or multiple control plane entities (e.g., service cards) within a single device. In some instances, the uniform interface is an IP address or other network layer address of mobile gateway 8 that is shared among all control plane entities.

Session manager 11 of mobile gateway 8 establishes subscriber sessions for wireless devices 6 that determine operations performed by the mobile gateway on subscriber packets associated with respective subscriber sessions. In general, a subscriber session is an association between SP network 4 and any of wireless devices 6 that is identifiable by a combination of a wireless device 6 PDP address and an Access Point Name (APN) for a service provided by PDN 12, although SP network 4 may use a default APN where wireless device 6B does not specify an APN. A subscriber session (alternatively referred to herein as a "CAN session" or "session") is thus a service-specific (as specified by the APN) session for a service provided to the associated one of wireless devices 6. In an IP-based SP network 4, a subscriber session is an IP-CAN session.

Upon establishing a subscriber session, mobile gateway 8 performs PGW functionality with respect to the subscriber session, including one or more of packet filtering, lawful interception, IP address allocation (performed during subscriber session establishment), accounting, rate enforcement and traffic shaping, bearer binding to identify bearers to route and forward service packets, packet encapsulation/decapsulation for GTP-U traffic exchanged within bearers, and route lookup of packets' outer IP addresses and packet forwarding.

Mobile gateway 8 includes a decentralized data plane in that data plane functionality and packet forwarding functionality is distributed among a plurality of forwarding units 10A-10N ("forwarding units 10"). Each of forwarding units 10 connects to one or more instances of the various LTE interfaces. For example, forwarding unit 10B implements an S5 interface with SGW 22B and an S5 interface with SGW 22C. As another example, forwarding unit 10A implements an S5 interface with SGW 22A and an S5 interface with SGW 22B. Forwarding units 10N implements an SGi interface for exchanging subscriber data traffic with PDN 12.

Each of forwarding units 10 includes hardware or a combination of hardware and software that forward subscriber traffic, in accordance with forwarding information, from an inbound S5/SGi interface to an outbound S5/SGi interface. One or more physical interface cards (PICs) together with one or more packet processors reside on each of forwarding units 10, which are insertable within a mobile gateway 8 chassis. Each forwarding unit thus presents a network interface for sending and receiving subscriber traffic and also includes packet processing capabilities to enable subscriber data packet processing with respect to subscriber sessions to perform aspects of mobile gateway 8 functionality.

Each of session contexts 26A-26N stored by respective forwarding units 10A-10N represent, for one or more subscriber sessions anchored by the respective forwarding unit, data for session context information (or "session data") that specifies data plane operations for subscriber traffic associated with the subscriber session. Session contexts 26B of forwarding unit 10B stores, for example, context data for one or more subscriber sessions anchored by forwarding units 10B. A forwarding unit "anchors" a subscriber session in the decentralized data plane of mobile gateway 8 by processing subscriber traffic associated with the subscriber session using the context information for the subscriber session to perform the specified data plane operations. Session manager 11 receives associated context information from elements of SP network 4 and/or devices external to the network while establishing a subscriber session.

Any of wireless devices 6 initiates an attach request to attach to SP network 4 to enable service traffic exchange with PDN 12. Elements of SP network 4 notifies mobile gateway 8 of the attach request. In the illustrated example, elements SP network 4 receive a request to create a subscriber session initially issued by subscriber device 6B and send representations of this request to mobile gateway 8. MME 24 receives the attach request from access network 10B, selects SGW 22B to service the session, and directs SGW 22B to send create session request 16 as a Create Session Request message to mobile gateway 8 operating as a PGW of an EPC of an LTE network. In some examples, an SGSN may send a Create PDP Context Request to mobile gateway 8 operating as a GGSN of a GPRS packet-switched network.

Forwarding unit 10A receives create session request 16 and forwards the request to session manager 11 of mobile gateway 8, which establishes a subscriber session for wireless device 6B by executing control protocols to identify and authenticate wireless device 6B (or a subscriber using the device), receive PDP address configuration, and communicate with other elements of SP network 4 to establish bearers to carry user traffic for the wireless device 6B, among other operations. In particular, session manager 11 establishes EPS bearer 18, which may represent a default or dedicated EPS bearer that carries service traffic (alternatively referred to as "subscriber data traffic," "subscriber traffic," or "user traffic") between PDN 12 and wireless device 6B. EPS bearer 18 represents an example of a network tunnel between mobile gateway 8 (e.g., a PDN gateway device) and mobile device 6B, passing through SGW 22B.

Session manager 11 receives or generates, while establishing the new subscriber session, session context information that associates subscriber data traffic for the session with one or more bearers and further defines other packet processing operations to be applied by one of forwarding units 10 to the subscriber data traffic. Session manager 11 additionally selects one of forwarding units 10 to anchor the new subscriber session according to techniques of this disclosure so as to reduce a number of internal forwarding hops for subscriber traffic associated with the subscriber session among forwarding units 10. Session manager 11 may consider a number of factors when selecting the anchoring forwarding unit 10 for the new subscriber session.

As noted above, EPS bearer 18 represents an example of a network tunnel from mobile gateway 8 (a PGW device, in the example of FIG. 1) to mobile device 6B. Accordingly, mobile gateway 8 fragments packets sent via EPS bearer 18 to mobile device 6B, in some examples. FIG. 1 illustrates packet fragments 17A, 17B, 17C, and 17D (packet fragments 17) in transit via EPS bearer 18. In accordance with the techniques of this disclosure, any or all of SGWs 22 are configured to perform in-line packet reassembly of packet fragments, such as packet fragments 17. That is, forwarding units of SGWs 22 may include hardware units for performing packet reassembly from packet fragments that are received in order, without directing the packet fragments to a separate element, such as a control plane unit. In this manner, SGW 22B, for example, may identify the target mobile device (mobile device 6B) of each of packet fragments 17.

By fragmenting a packet into packet fragments 17, SGW 22B may not have access to a tunnel header of a fragmented packet in transit via EPS bearer 18, unless the packet is reassembled. The techniques of this disclosure include in-line packet reassembly of packet fragments, allowing SGW 22B to reassemble a packet from packet fragments 17 in-line, which may significantly improve utilization of processing resources and increase the efficiency with which packet fragments 17 can be reassembled. Accordingly, SGW 22B may quickly and efficiently determine the destination mobile device of packet fragments 17, for purposes of tracking, management, billing, service provision, or the like. Furthermore, SGW 22B may decapsulate and forward inner IP packets toward an RNC/eNode B of access network 10B, following reassembly of packet fragments 17.

Figure 2:
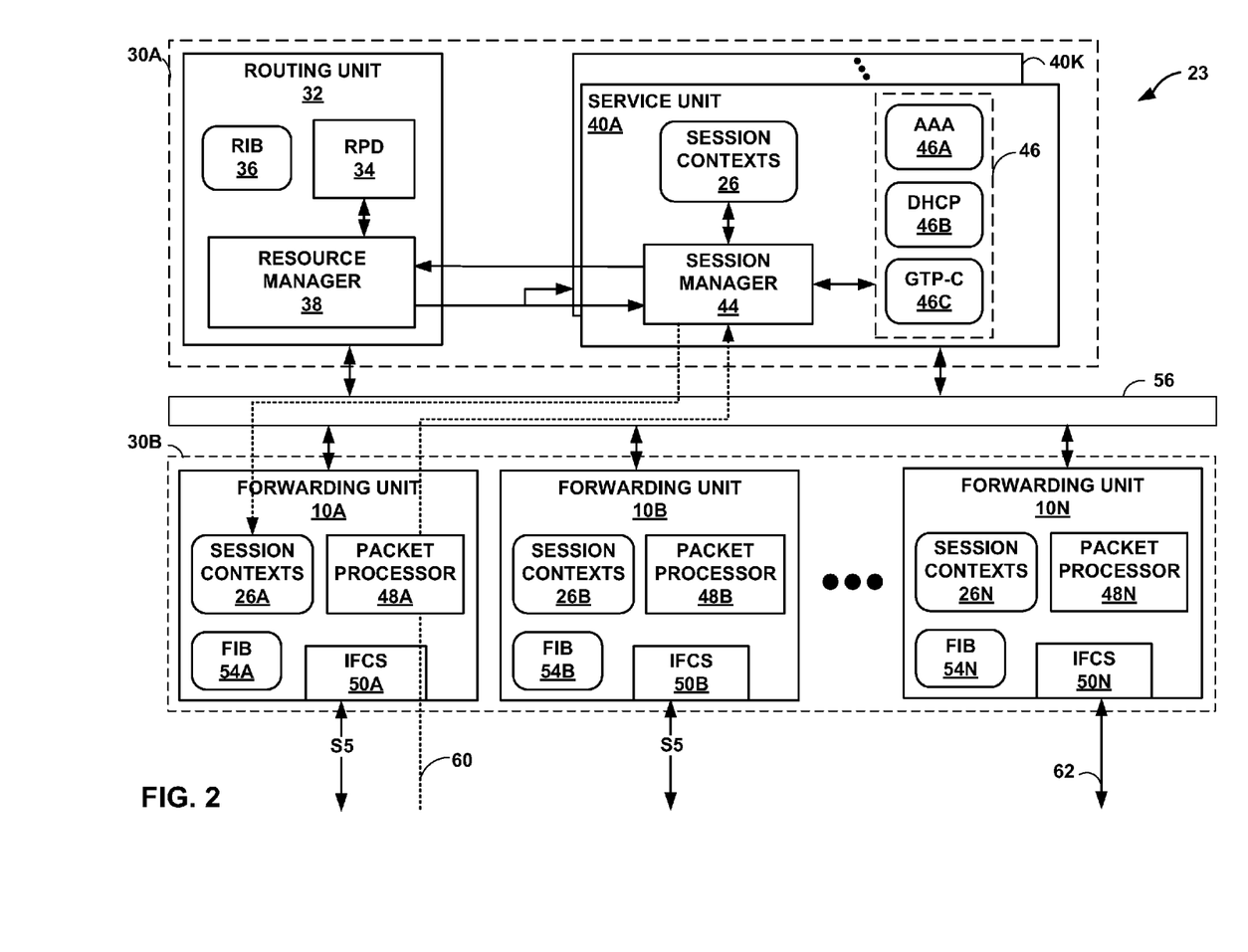
FIG. 2 is a block diagram illustrating an example set of components for a serving gateway.

FIG. 2 is a block diagram illustrating an example set of components for serving gateway 23. Serving gateways 22 of FIG. 1 may include components substantially similar to those of serving gateway 23 shown in FIG. 2. In this example, serving gateway 23 is divided into two logical or physical "planes" to include a first control plane 30A and a second "data" or "forwarding" plane 30B. That is, serving gateway 23 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software to implement the functionality.

In accordance with the techniques of this disclosure, reassembly of packets from packet fragments may be performed "in-line" by hardware elements of forwarding unit 10, in that packet reassembly may be performed in data plane 30B as the packet fragments are received in order. As explained below, in certain cases, packet reassembly is alternatively performed in control plane 30A, e.g., when packet fragments for a packet are received out of order or when the fragments violate a configured assumption, such as exceeding a maximum number of packet fragments or exceeding a maximum packet fragment length.

Control plane 30A is a decentralized control plane in that control plane functionality is distributed among routing unit 32 and a plurality of subscriber management service units 40A-40K (illustrated as "service units 40"). Similarly, data plane 30B in this example is a distributed data plane in that data plane functionality and packet forwarding functionality is distributed among a plurality of forwarding units 10A-10N ("forwarding units 10"). In some instances, packet forwarding functionality may be consolidated in a single forwarding unit.

Each of routing unit 32, subscriber management service units 40, and forwarding units 10 may include one or more processors (not shown in FIG. 2) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory, random access memory or RAM) or any other type of volatile or non-volatile memory, that stores instructions to cause the one or more processors to perform the techniques described herein. Alternatively or additionally, each of routing unit 32, subscriber management service units 40, and forwarding units 10 may include dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Switch 56 couples routing unit 32, subscriber management service units 40, and forwarding units 10 to deliver data units and control messages among the units. Switch 56 may represent an internal switch fabric or cross-bar, bus, or link. Examples of high-speed multi-stage switch fabrics used as a data plane to relay packets between units within a router are described in U.S. Patent Application 2008/0044181, entitled "MULTI-CHASSIS ROUTER WITH MULTIPLEXED OPTICAL INTERCONNECTS." The entire contents of U.S. Patent Application 2008/0044181 are incorporated herein by reference.

Data plane 30B represents hardware or a combination of hardware and software that forward network traffic in accordance with forwarding information. In the example serving gateway 23 of FIG. 2, data plane 30B includes forwarding units 10 that provide high-speed forwarding of subscriber data traffic received by interface cards 50A-50N ("IFCs 50") via LTE reference points. Interface cards 50A, 50B interface with LTE reference point S5, and forwarding units 10A therefore implement protocol interfaces for user plane tunneling and tunnel management between serving gateway 23 and an upstream mobile gateway, such as mobile gateway 8. Interface cards 50N connect serving gateway 23 to an access network, such as one of access networks 10 (FIG. 1) via connection 62.

Forwarding units 10 receive and forward control and data packets via switch 22 along internal forwarding paths to anchoring units for the control and data packets. Forwarding units 10 may each include one or more packet forwarding engines ("PFEs") coupled to respective interface cards 50 and may each represent, for example, a dense port concentrator (DPC), modular port concentrator (MPC), flexible physical interface card (PIC) concentrator (FPC), or another line card, for example, that is insertable within a serving gateway 23 chassis or combination of chassis. Interface cards 50A, for instance, may therefore include multiple PICs that each includes one or more inbound/outbound interfaces. Each of forwarding units 10 may include substantially similar components to perform substantially similar functionality, said components and functionality being described hereinafter primarily with respect to forwarding unit 10A.

Internally, each of forwarding units 10 may include a unique identifier that identifies the forwarding unit to other components of serving gateway 23. Forwarding units 10 identifiers may include an index, slot, identifying string, internal IP address, interface identifier such as an outbound interface identifier, or link layer address, for instance. In some examples, inbound and outbound interfaces (e.g., ports) of interface cards 50 may be specified by identifying the port type, a slot in a serving gateway 23 chassis for the corresponding one of forwarding units 10, a PIC, and a port number. For example, GigE-3/1/2 identifies port 2 of PIC 1 on the one forwarding units 10 that occupies slot 3 in the serving gateway 23 chassis, and the port is a Gigabit Ethernet port.

Forwarding unit 10A includes a packet processor that receives control and data session traffic via IFC card 50A and, if necessary, internally forwards the traffic to the anchoring one of subscriber management service units 40 (control traffic) or to the anchoring one of forwarding units 10 (data traffic) according to internal routes installed to forwarding information base 54A. Further details regarding internal packet forwarding are found in U.S. patent application Ser. No. 13/248,834, filed Sep. 9, 2011 and entitled "MOBILE GATEWAY HAVING REDUCED FORWARDING STATE FOR ANCHORING MOBILE SUBSCRIBERS," the entire contents of which are hereby incorporated by reference.

Routing unit 32 of control plane 30A executes the routing functionality of serving gateway 23. In this respect, routing unit 32 represents hardware or a combination of hardware and software of control that implements with routing protocol daemon 34 ("RPD 34") routing protocols by which routing information, stored in a routing information base 36 ("RIB 36"), may be exchanged with other routers. RIB 36 may include information defining a topology of a network, such as core network 5 and/or PDN 12 of FIG. 1. RPD 34 may resolve the topology defined by routing information in RIB 36 to select or determine one or more routes through the network. For each of the selected routes, RPD 34 adds an entry to a route table that specifies, for the selected route, one or more outbound interfaces of various IFCs 50.

The route table may be implemented as a radix tree having nodes that each key to a network address prefix, such as an IPv4/IPv6 network address prefix, and specify an outbound interface for the network address prefix. RPD 34 may then update data plane 30B with this forwarding information directly or via resource manager 38, where forwarding units 10 of data plane 30B store the forwarding information in respective forwarding information bases 54A-54N ("FIBs 54"). Further details of one example of a router can be found in U.S. patent application Ser. No. 12/182,619, filed Jul. 30, 2008 and entitled "STREAMLINED PACKET FORWARDING USING DYNAMIC FILTERS FOR ROUTING AND SECURITY IN A SHARED FORWARDING PLANE," which is incorporated herein by reference.

Resource manager 38 of routing unit 32 allocates and manages resources of serving gateway 23 among service units 40 and forwarding units 10. In addition, resource manager 38 mediates communication among service units 40 and other components of routing 32, in particular, between session manager 44 and RPD 34 of routing unit 32.

Subscriber management service units 40 of control plane 30A present a uniform interface to downstream devices and provide decentralized subscriber session setup and management for serving gateway 23. For example, all of subscriber management service units 40 may be addressable by the same IP or other PDP address, and control messages destined for the same IP or other PDP address of subscriber management service units 40 may therefore be handled by any of the service units. Internally, each of subscriber management service units 40 may include a unique identifier that identifies the service unit to other components of serving gateway 23. Subscriber management service units 40 identifiers may include, for example, an index, slot, identifying string, internal IP address, or link layer address.

Subscriber management service units 40 may each represent, for example, a packet forwarding engine (PFE) or other component of a physical interface card insertable within one or more chassis of serving gateway 23. The physical interface card may be, for instance, a multi-services dense port concentrator (MS-DPC). One or more of subscriber management service units 40 may also each represent a co-processor executing on a routing node, such as routing unit 32. Subscriber management service units 40 may be alternatively referred to as "service PICs" or "service cards." Each of subscriber management service units 40 includes substantially similar components to perform substantially similar functionality, said components and functionality being described hereinafter with respect to subscriber management service unit 40A (hereinafter, "service unit 40A"). Additional details regarding handling subscriber sessions with a decentralized control plane of multiple subscriber management service units may be found in U.S. patent application Ser. No. 13/172,556, entitled "MOBILE GATEWAY HAVING DECENTRALIZED CONTROL PLANE FOR ANCHORING SUBSCRIBER SESSIONS," filed Jun. 29, 2011, the entire contents of which are hereby incorporated by reference.

Session manager 44 of service unit 40A establishes sessions, requested by a subscriber via a mobile service provider network in which serving gateway 23 is located, and manages the sessions once established. Each of subscriber management service units 40 includes an instance of session control module 44 and may therefore independently execute control plane protocols 46 required to establish a requested session for a subscriber. In this sense, the subscriber management service units 40 provide a form of a decentralized control plane for managing subscriber communication sessions. As a result, the serving gateway 23 may achieve increased scalability to handle thousands or millions of concurrent communication sessions from wireless devices.

Session manager 44 receives requests to create or update subscriber sessions and responsively creates or updates the sessions by executing control protocols 46 to receive session context information. In the illustrated example, IFC 50A of forwarding unit 10 receives create session request 60, which packet processor 48A directs to service unit 40A via switch 56 in accordance with internal forwarding information in FIB 54A. To create and anchor the requested session in session contexts 42, session manager 44 authenticates and receives profile information for a subscriber and/or subscriber service identified in the request by executing AAA 46A. Session manager 44 may also request an IP address from a DHCP server for the requested session by executing DHCP 46B. Session manager 44 may also negotiate with other mobile service provider network devices, using GTP-C 46C messages, to create or modify a set of one or more bearers that carry service traffic for the requested session in GTP-U tunnels. In this way, session manager 44 establishes session contexts 42 with session context information for the subscriber session requested by create session request 60. These control protocols are exemplary, and session manager 44 may execute other protocols related to charging, for example, to receive additional session context information for the session.

The new session context stored in session contexts 52 for the request subscriber session stores session context information either generated by or received by serving gateway 23 by executing control protocols 46. The session context information defines the operations to be performed on subscriber traffic associated with the corresponding subscriber session. Such session context information may include, for example, the PDP (e.g., IP) address allocated by a DHCP server or another entity for the wireless device for use in sending and receiving subscriber packets, forwarding information used by forwarding units 10 in forwarding subscriber packets such as tunnel endpoint identifiers (TEIDs) and identifiers/addresses for downstream service nodes, the Access Point Name (APN) for the session, charging information, and one or more quality of service (QoS) profiles for the associated subscriber.

As control plane anchors for subscriber sessions, subscriber management service units 40 handle configuration of forwarding units 10 for constructing session-specific forwarding paths for processing and forwarding subscriber data traffic associated with the subscriber sessions. Session contexts 26 of forwarding units 10 may each represent a subset of a chain of forwarding next hops that determine the operations applied to associated subscriber data traffic. Example details on subscriber management service units 40 constructing subscriber-specific forwarding paths within forwarding units 10 can be found in Example details on internal forwarding paths of forwarding units 10 can be found in U.S. patent application Ser. No. 13/172,505, entitled "VARIABLE-BASED FORWARDING PATH CONSTRUCTION FOR PACKET PROCESSING WITHIN A NETWORK DEVICE," filed Jun. 29, 2011, the entire contents being incorporated herein by reference.

Any one of forwarding units 10 may operate as an anchoring forwarding unit for a particular one of session contexts 26 to perform forwarding functionality on subscriber packets associated with the corresponding subscriber session. In other words, processing subscriber traffic for each of session contexts 26 may be handled by any of forwarding units 10 (i.e., the anchor forwarding unit). The respective anchor forwarding units for upstream and downstream subscriber traffic for a subscriber session may be the same forwarding unit or different forwarding units.

Packet processors 48A-48N ("packet processors 48") of respective forwarding units 10 apply respective session contexts 26 to packets associated with subscriber sessions anchored in the data plane by the forwarding unit 10 that includes the packet processor. Each of packet processors 48 may represent computational components of a packet forwarding engine or network processor, for instance, and includes one or more general- or special-purpose processors, ASICs, ASSPs, FPGAs, or other programmable logic for forwarding packets in accordance with a corresponding one of FIBs 54 and processing packets in accordance with a corresponding one of session contexts 26. Packet processing operations applied by network processors 48 may include subscriber charging, firewall, protocol demultiplexing, tunnel encapsulation/decapsulation, internal forwarding, quality of service (QoS) policing, and route lookup operations.

Packet processors 48 represent examples of hardware-based processing elements of forwarding units of an SGW device. As explained below, packet processors 48 may be configured to perform the techniques of this disclosure. In this manner, any or all of packet processors 48 may be configured to hash a source Internet protocol (IP) address, a destination IP address, and a fragment identifier value for a received packet fragment to determine an entry of a hash table, wherein the entry of the hash table includes data defining a next expected offset, a next expected fragment identifier, and a reference to a fragment table comprising data for at least one previous packet fragment corresponding to the packet fragment, to compare a length of the packet fragment to the next expected offset and to compare the fragment identifier value for the packet fragment to the next expected fragment identifier, and store the packet fragment using the fragment table based on the comparisons.

A packet gateway (PGW) device, such as mobile gateway 8 (FIG. 1) may fragment packets that exceed an MTU size for the S5 interface coupled to IFCs 50A. Thus, IFCs 50 may receive packet fragments from a mobile gateway. In accordance with the techniques of this disclosure, hardware elements of forwarding unit 10 may reassemble the packet fragments in line, that is, as the packet fragments are received. Thus, rather than sending packet fragments to a processor in service plane 30A, packet fragment reassembly may be performed in line by hardware elements in data plane 30B. For example, packet processors 48 may be implemented as application-specific integrated circuits, which may be configured to perform in line packet reassembly in accordance with the techniques of this disclosure. Additional details regarding in line packet reassembly are described below with respect to FIGS. 3 and 4. Moreover, in some cases, it may not be possible to perform in line packet reassembly, e.g., when packet fragments are received out of order. Thus, one of service units 40 may implement conventional packet reassembly techniques, and forwarding units 10 may direct data for certain packets to the one of service units 40 for reassembly. Accordingly, the techniques of this disclosure may allow for packet reassembly either in data plane 30B or control plane 30A.

Figure 3:
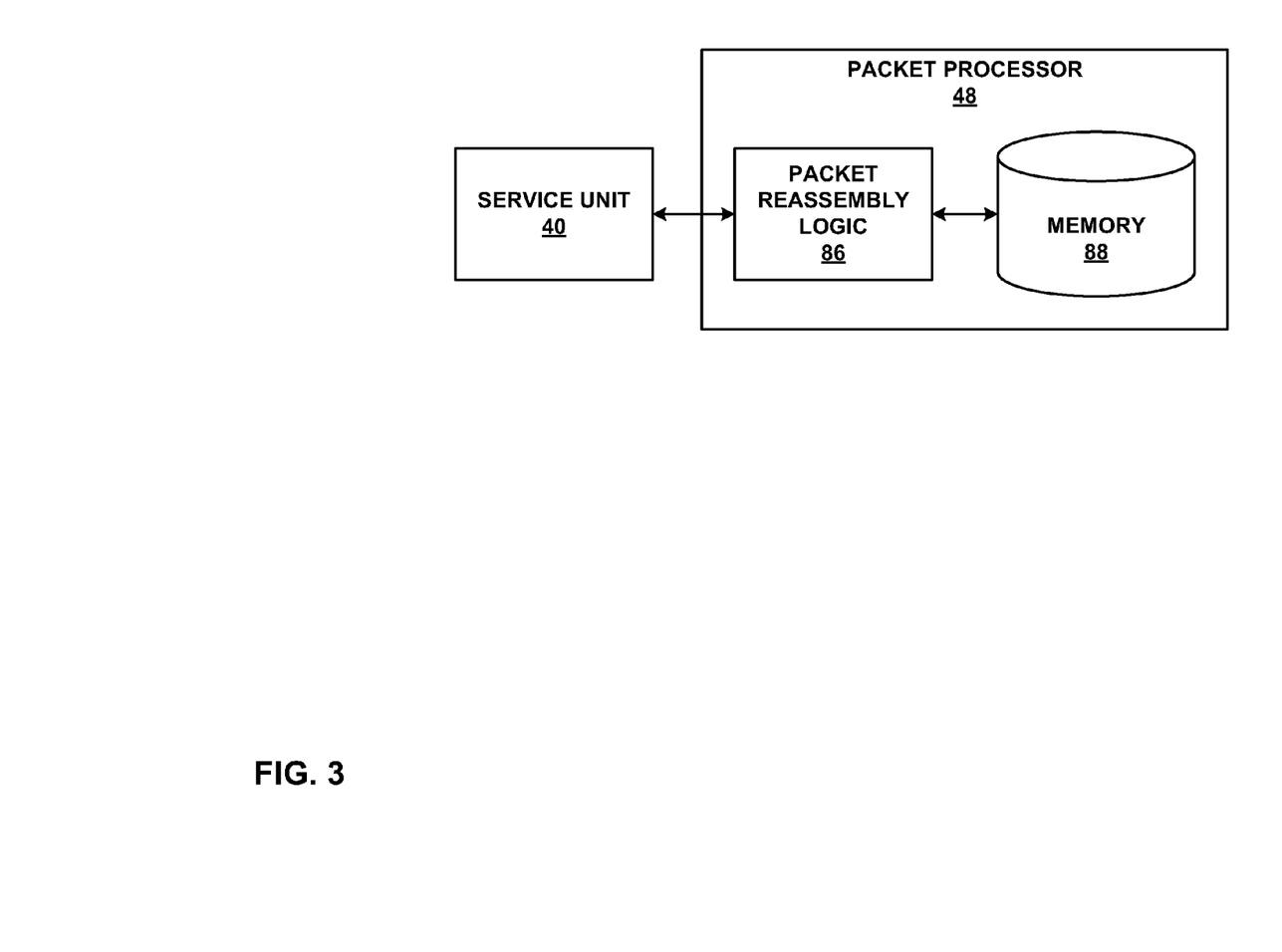
FIG. 3 is a block diagram illustrating an example set of components for a control unit of a forwarding unit of a serving gateway.

FIG. 3 is a block diagram illustrating an example set of components for packet processor 48 of one of forwarding units 10 of serving gateway 23 (FIG. 2). In particular, packet processor 48 may correspond to one or more hardware units of one of forwarding units 10 of serving gateway 23 (FIG. 2).

Each of packet processors 48 (FIG. 2) may include one or more hardware elements corresponding to packet processor 48. In this manner, each of the forwarding units of SGWs 22 of FIG. 1 may include components that are substantially similar to those of packet processor 48 of FIG. 3. Packet processor 48 may generally be referred to as a "control unit" in the sense that packet processor 48 includes one or more processing units configured to perform the functionality attributed thereto. For example, packet processor 48 may be implemented as one or more digital signal processors (DSPs), application specific integrated circuits (ASICs), field programmable gate arrays (FPGAs), or any other equivalent integrated or discrete logic circuitry, as well as any combinations of such components.

As shown in FIG. 2, packet processor 48 is communicatively coupled to one or more interface cards (IFCs), such as IFCs 50 (FIG. 2). In some cases, one of the IFCs receives packet fragments from the PGW device. In response to receiving a packet fragment, the IFCs send the packet fragment to packet processor 48. Packet reassembly logic 86 of packet processor 48 may receive the packet fragment and attempt to reassemble the packet fragment in-line with other packet fragments. That is, as explained above, packet reassembly logic 86 may store each sequential packet fragment in order, such that the packet can be extracted from memory after all packet fragments have been stored, in accordance with the techniques of this disclosure. Accordingly, packet reassembly logic 86 determines whether a received fragment is a first fragment of a packet, or whether another packet fragment of the same packet has already been received.

More particularly, as explained in greater detail below, packet reassembly logic 86 may execute a hash function on identifying data of the packet fragment. In one example, packet reassembly logic 86 uses a source IP address, a destination IP address, and an IP Identifier as a key (that is, input value) for the hash function. The hash table is stored in memory 88, in this example. Therefore, packet reassembly logic 86 may determine whether there is an entry in a location of the hash table of memory 88 corresponding to the result of the execution of the hash table on the key value, to determine whether the received packet fragment is an ordinal-first fragment of a new packet.

In response to a packet fragment of a new packet, packet reassembly logic 86 stores a value representative of an expected offset and an expected fragment ID for a subsequent fragment of the new packet in the hash table of memory 88. In this manner, upon receiving a subsequent packet fragment, packet reassembly logic 86 can determine whether the subsequent packet fragment corresponds to the same new packet as a previously received packet fragment. If so, packet reassembly logic 86 updates the values of the next expected offset and next fragment ID and awaits another packet fragment.

Packet reassembly logic 86 of packet processor 48 is also coupled to service unit 40. Service unit 40 is external to the corresponding forwarding unit including packet processor 48, as shown in FIGS. 2 and 3. For example, whereas each of forwarding units 10 of FIG. 2 may include components similar to packet processor 48, service unit 40 may be implemented by one or more processing units of control plane 30A, namely, one of service units 40. The functionality attributed to service unit 40 for reassembling packets may be implemented in hardware, software, firmware, or any combination thereof. Of course, when implemented in software, it is presumed that requisite hardware (such as one or more processing units and memory for storing instructions for the software) are also provided.

In some cases, in-line packet reassembly may not be possible. In such cases, packet reassembly logic 86 sends packet fragments of packets that cannot be reassembled in-line to service unit 40 for reassembly. The decision to send the packet to service unit 40 may be made for any packet fragment. However, in general, packet reassembly logic 86 performs in-line packet reassembly of packet fragments, which may be significantly faster and more efficient than service unit 40. In this manner, service unit 40 of FIG. 3 represents an example of a service unit operating in a control plane of an SGW device. When packet processor 48 determines that in line packet reassembly is not possible, e.g., when comparisons indicate that at least one of the length of a packet fragment does not correspond to a next expected offset, a fragment identifier value does not correspond to a next expected fragment identifier, or when there are more than an expected number of packet fragments, packet processor 48 may cause service unit 40 to perform packet reassembly, e.g., in software.

Figure 4:
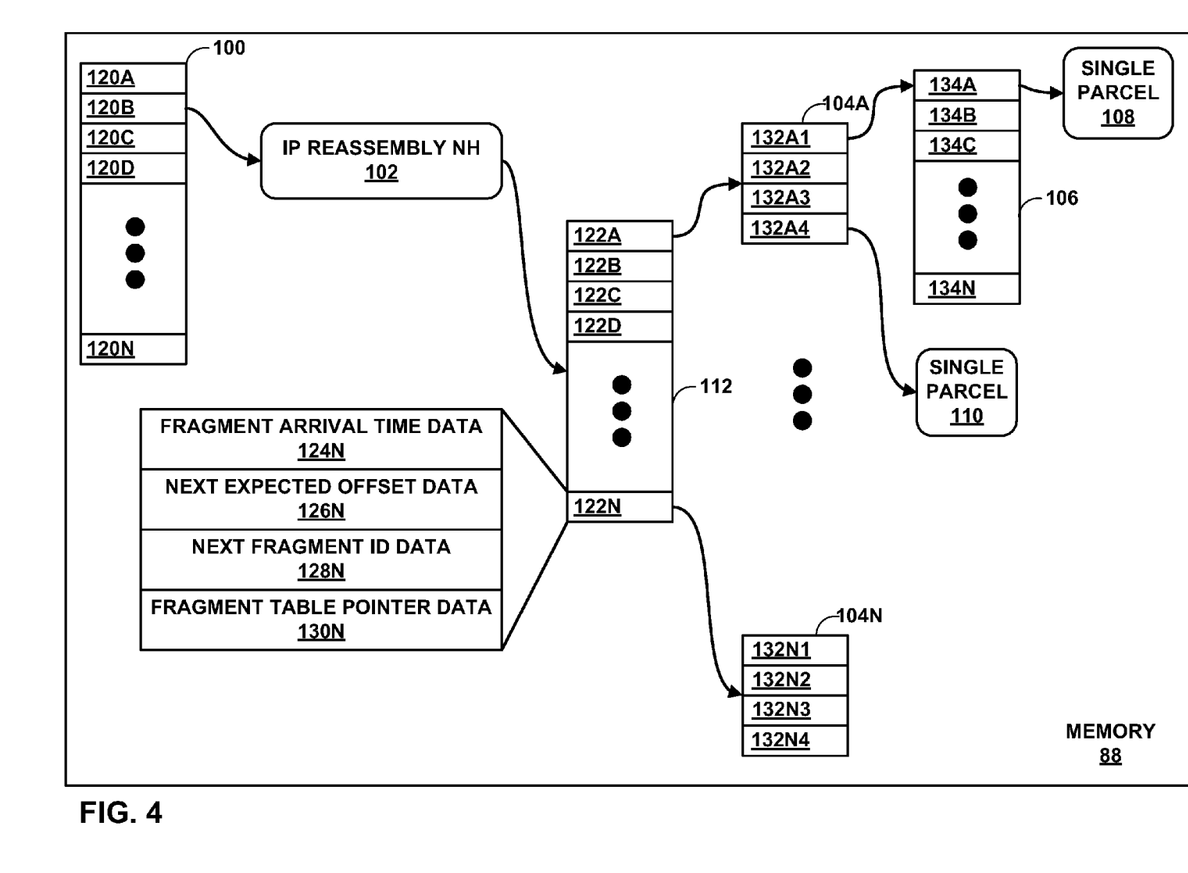
FIG. 4 is a conceptual diagram illustrating relationships between various tables for performing in-line packet reassembly.

FIG. 4 is a conceptual diagram illustrating relationships between various tables for performing in-line packet reassembly. In particular, FIG. 4 illustrates an example set of tables stored in memory 88 (FIG. 3). In the example of FIG. 4, memory 88 includes token table 100, IP reassembly next hop (NH) 102, fragment tables 104A-104N (fragment tables 104), parcel tables such as parcel table 106, and IP fragment hash table 112. Token table 100 includes entries 120A-120N (entries 120) representing IP reassembly NH 102, which implements packet reassembly logic 86 in accordance with the techniques of this disclosure. That is, IP reassembly NH 102 represents functionality implemented by packet reassembly logic 86 (or, more generally, one of packet processors 48) for reassembling a packet from packet fragments. Accordingly, IP reassembly NH 102 need not necessarily be included within memory 88 itself, but may be implemented by packet processor 48, e.g., in the form of packet reassembly logic 86. In this example, entries 120 may initiate a packet reassembly process, e.g., via IP reassembly NH 102.

IP fragment hash table 112 includes entries 122A-122N (entries 122). Entries 122 generally correspond to a fragment table, that is, one of fragment tables 104. Moreover, as shown in FIG. 4, the result of IP reassembly NH 102 corresponds to one of entries 122. Thus, by executing IP reassembly NH 102, entries 120 of token table 100 can be matched to a corresponding one of entries 122 of IP fragment hash table 112. Entries 122 of IP fragment hash table 112 include data representative of a first fragment arrival time, a next expected offset, a next fragment ID, and a fragment table pointer. The fragment table pointer in an entry of IP fragment hash table points to one of fragment tables 104.

For example, as shown in FIG. 4, entry 122N includes fragment arrival time data 124N, next expected offset data 126N, next fragment ID data 128N, and fragment table pointer data 130N. For example, fragment table pointer data 130N may store the address of fragment table 104N. In this manner, entries 122 may include pointers to corresponding ones of fragment tables 104. The pointers may correspond to data for a memory address of the beginning of the corresponding one of fragment tables 104.

Fragment tables 104 also include a set of entries. In this example, fragment table 104A includes entries 132A1-132A4, and fragment table 104N includes entries 132N1-132N4 (entries 132). In general, entries 132 of fragment tables 104 correspond to fragments of a packet, assuming that a packet is split into four fragments. In this example, entries 132 of fragment tables 104 may correspond to single parcels, such as single parcel 110, or a parcel table, such as parcel table 106. Parcel table 106 further includes entries 134A-134N (entries 134). Entries 134 of parcel tables correspond to parcel data, such as parcel data 108.

Internet protocol (IP) packet fragmentation typically does not specify a fragment sequence. Typically, a fragment of an IP packet includes data indicating an offset in the original packet. This could mean that there is potentially any number of fragments before the current fragment. To simplify LU processing of fragments, the techniques of this disclosure assume the following:

1. Reassemble packets that are received in order
2. A fragment will not be over 2K in size
3. No more than four fragments per packet If any of the above conditions are not met, then the fragments may be sent to service unit 40 (FIG. 3) for reassembly. The decision to send the packet to service unit 40 for reassembly may happen at any fragment reception. Otherwise, fragments may be processed in hardware, e.g., by packet reassembly logic 86. The techniques of this disclosure may also accommodate other assumptions, e.g., other sizes of fragments and/or other numbers of fragments per packet. FIG. 4 illustrates an example process for processing fragments to reassemble a packet in-line. In this example, initially, an ingress PFE forwarding table filter (FTF) of SWG 80 term load-balances fragments based on a source IP address, a destination IP address, and an IP identifier <SIP, DIP, IP_ID> to a trio. Token table 100 on a reassembly trio starts the reassembly ucode next hop (NH) and also sets the VRF ID.

When LU ucode (which may comprise an element of packet reassembly logic 86) receives a first fragment (that is, the ordinal first fragment of a packet), a new hash table entry is created in IP fragment hash table 112 with hash key <Source IP, Destination IP, IP Identifier> of the fragment. To create the new hash table entry, packet reassembly logic 86 may perform a "hash add" process, which attempts to add a new entry into IP fragment hash table 112 based on a result of a hash function executed on the hash key. The hash add process may comprise, for example, executing a hash function using hash key <Source IP, Destination IP, IP Identifier> as input, and determining one of entries 122 corresponding to the output of the hash function.

If the hash add process fails (e.g., when the one of entries 122 corresponding to the output of the hash function executed on the hash key is already occupied), the packet is sent to service unit 40 for reassembly. Otherwise, if the hash add process is successful (e.g., when the one of entries 122 corresponding to the result of hashing the hash key is available and not occupied with other data), packet reassembly logic 86 updates the NextExpectedOffset value in the one of entries 122 of IP fragment hash table 112, using the length of the first fragment. Packet reassembly logic 86 also increments the value of NextFragID in the one of entries 122 of IP fragment hash table 112 for the fragment.

For purposes of example, assume that entry 122C of IP fragment hash table 112 does not currently include data for a packet to be reassembled. Packet reassembly logic 86 may receive a first fragment of a new packet, and determine the hash key <Source IP, Destination IP, IP Identifier> for the new packet. Packet reassembly logic 86 may then execute a hash function on the hash key hash key <Source IP, Destination IP, IP Identifier> for the new packet, which may correspond to entry 122C. Packet reassembly logic 86 may then store data in entry 122C similar to the data of entry 122N shown in FIG. 4. For example, packet reassembly logic 86 may store fragment arrival time data for the arrival of the first fragment of the new packet in entry 122C. Packet reassembly logic 86 may also store the length of the first fragment of the new packet as next expected offset data in entry 122C. Packet reassembly logic 86 may also increment next fragment ID data of entry 122C based on a fragment ID of the first fragment of the new packet. Furthermore, packet reassembly logic 86 may store the fragment using a corresponding fragment table 104, e.g., fragment table 104C (not shown in FIG. 4).

If the fragment is not a first fragment (that is, not the first fragment of a packet), then packet reassembly logic 86 queries IP fragment hash table 112 with key <Source IP, Destination IP, IP Identifier> of the fragment, thereby performing a lookup for the one of entries 122 of IP fragment hash table 112 corresponding to the recently received fragment. If the lookup fails, packet reassembly logic 86 sends the packet to service unit 40. Otherwise, that is, if the lookup succeeds, if the next expected fragment offset in the hash result is not the same as the one in the hash result of IP fragment hash table 112, then all fragments (this fragment and stored fragments) are sent to service unit 40, and the hash entry is deleted from IP fragment hash table 112.

If the packet is indeed the next expected fragment, the packet is moved to DMEM (that is, an entry of a corresponding one of fragment tables 104), the next expected fragment is updated, and NextFragID is updated. Continuing the example above, if a second fragment of a packet corresponding to entry 122C is received, packet reassembly logic 86 may update the fragment arrival time data, the next expected offset data (e.g., based on the length of the second fragment), and the next fragment ID data, and may store the second packet to the corresponding one of fragment tables 104. If the fourth received fragment is not the last fragment, then all the fragments are sent to service unit 40 and the hash table entry of IP fragment hash table 112 is deleted, in this example. Of course, in other examples, other numbers of fragments may be expected.

The reassembly context hash table (e.g., IP fragment reassembly table 112) is used to store the reassembly context. This hash table is looked up using key <VRFIF, SIP, DIP, IP_ID>. The result of this table contains:
1. First fragment arrival time
2. Next Expected Offset
3. NextFragId
4. Pointer to fragment table.

The hash table contains 10K entries, in one example, making it possible to store 10K different contexts. Anything beyond the capacity for entries results in the fragments being sent to service unit 40.

Fragment tables 104 contain four descriptors (one of entries 132 in FIG. 4), each pointing to either a single parcel (assuming a fragment has a size of less than 256 B) or a parcel table (when fragment the fragment has a size between 256 B and 2K). Single parcel 110 represents an example of a single parcel, while parcel table 106 represents an example of a parcel table. The same fragment tables 104 may be used in packet fragment reassembly as are used in multilink point to point protocol (MLPPP) reassembly. In this example, fragment tables 104 are restricted to four entries, to support four fragments, based on the assumptions stated above. Anything beyond four fragments will result in the packet being reassembled in service unit 40, in this example. Of course, in other examples, other amounts of fragments may be permitted before being sent to service unit 40.

The example of parcel table 106 contains 8 parcel descriptors. Parcel table 106 and its descriptors may be the same as those used in MLPPP reassembly. Parcel tables are restricted to 8 entries to support fragment sizes of only up to 2K, in this example. Anything beyond will result in the packet being reassembled in service unit 40, in this example, again based on these assumptions.

Assume that a packet ($IP_1$) includes fragments $IP_{1-1}$, $IP_{1-2}$, $IP_{1-3}$, and $IP_{1-4}$. The following are several possible scenarios:

In one example scenario, all fragments are received in order ($IP_{1-1}$, $IP_{1-2}$, $IP_{1-3}$, $IP_{1-4}$). In this case, $IP_{1-1}$ is received first. Since it a first fragment, <SIP, DIP, IP_ID> is added to IP fragment hash table 112. If the add succeeds, then the fragment is stored in DMEM, within either a parcel table ParcelTbl, such as parcel table 106, or a single parcel of 256 B. If the add fails, the fragment is sent to service unit 40. Afterwards, $IP_{1-2}$ is received, and since it is not a first fragment, <SIP, DIP, IP_ID> is looked up and succeeds. Since the expected offset in IP fragment hash table 112 is the same as the expected offset in fragment, the fragment is stored in DMEM. The same is true for $IP_{1-3}$ in this example. Next, $IP_{1-4}$ is received and <SIP, DIP, IP_ID> is looked up. Expected offset from hash result and offset in fragment match and since it is the last fragment, the packet is reassembled and sent out and the hash entry deleted.

In another example scenario, all fragments are received, but out of order (e.g., $IP_{1-1}$, $IP_{1-3}$, $IP_{1-2}$, $IP_{1-4}$). $IP_{1-1}$ is received first. Since it a first fragment, <SIP, DIP, IP_ID> is added to the hash table. If the add succeeds, then the fragment is stored in DMEM. If the add fails, the fragment is sent to service unit 40. In this example, $IP_{1-3}$ is received next, and since it is not a first fragment, <SIP, DIP, IP_ID> is lookup and succeeds and since expected offset in hash result is not the same as expected offset in fragment, all stored fragments ($IP_{1-1}$) and this fragment ($IP_{1-3}$) are sent to service unit 40, and the hash table deleted. $IP_{1-2}$ is received next, and since it is not a first fragment, <SIP, DIP, IP_ID> is looked up and fails. Thus, the fragment is sent to service unit 40. The same is true for $IP_{1-4}$.

In another example scenario, an intermediate fragment is missing (IP1-1, IP1-3, IP1-4). $IP_{1-1}$ is received. Since it a first fragment, <SIP, DIP, IP_ID> is added to the hash table. If add succeeds, then the fragment is stored in DMEM. If add fails, the fragment is sent to service unit 40. Next, $IP_{1-3}$ is received, and since it is not a first fragment, <SIP, DIP, IP_ID> is lookup and succeeds. Since the expected offset in hash result is not the same as expected offset in fragment, all stored fragments ($IP_{1-1}$) and this fragment ($IP_{1-3}$) are sent to service unit 40 and the hash table deleted. Next, $IP_{1-4}$ is received and since it is not a first fragment, <SIP, DIP, IP_ID> is looked up and fails and the fragment is sent to service unit 40.

In another example scenario, a tail fragment goes missing (IP1-1, IP1-2, IP1-3). $IP_{1-1}$ is received. Since it a first fragment, <SIP, DIP, IP_ID> is added to the hash table. If the add succeeds, then the fragment is stored in DMEM. If the add fails, the fragment is sent to service unit 40. $IP_{1-2}$ is received, and since it is not a first fragment, <SIP, DIP, IP_ID> is looked up and succeeds and since the expected offset in hash result is the same as expected offset in fragment the fragment is stored in DMEM. The same is true for $IP_{1-3}$, in this example. Eventually, a callout timer kicks in and causes packet reassembly logic 86 to send all fragments to service unit 40 and updates counter (drop or send to service unit 40). Sending to service unit 40 may be required if new APFEs are added.

Figure 5:
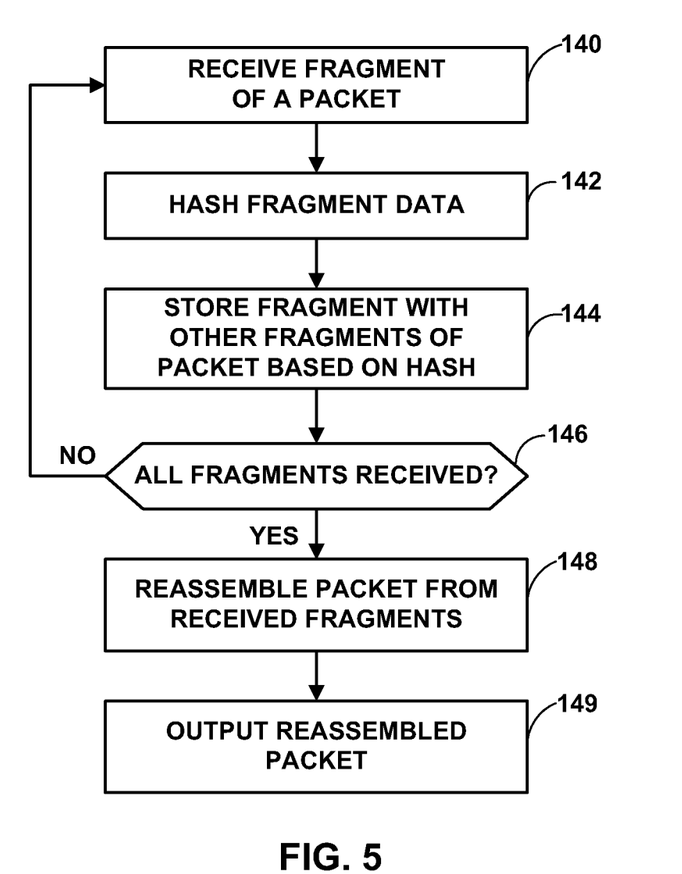
FIG. 5 is a flowchart illustrating an example method for performing in-line packet reassembly.

FIG. 5 is a flowchart illustrating an example method for performing in-line packet reassembly. The example method of FIG. 5 is described with respect to the devices of FIG. 1 for purposes of illustration, although it should be understood that other devices and components may be configured to perform this or similar methods. In this example, SGW 22B (e.g., a hardware-based processing element of a forwarding unit of SGW 22B). receives a packet fragment of a packet (140), such as one of packet fragments 17. SGW 22B then hashes the fragment data (142). For example, SGW 22B may execute a hash function on a key value for the packet fragment. As explained above, the key value may comprise the triplet <source IP address, destination IP address, IP identifier>.

The result of executing the hash function may correspond to one of entries 122 in IP fragment hash table 112 (FIG. 4). Thus, SGW 22B stores the fragment with other fragments of the packet based on the hash (144). If the fragment is an ordinal first fragment of a packet, SGW 22B may store the fragment using a new, unused one of fragment tables 104. If the fragment is not an ordinal first fragment of a packet, the one of entries 122 may point to a previously used one of fragment tables 104, such that SGW 22B may store the fragment with other fragments of the same packet. Storing the fragments of the packet together in this manner allows for inline packet reassembly, in that the fragments are stored in order. Thus, using the one of fragment tables 104, data for the fragments can be retrieved in order to reconstruct the packet.

Accordingly, after storing the fragment, SGW 22B determines whether all fragments of the packet have been received (146). If not all of the fragments of the packet have been received ("NO" branch of 146), SGW 22B waits to receive a next fragment of the packet (140). However, after all of the fragments of the packet have been received ("YES" branch of 146), SGW 22B reassembles the packet from the received fragments (148). For example, as discussed above, SGW 22B may retrieve data for each of the fragments from memory addresses identified by the corresponding one of fragment tables 104. This data retrieval may include retrieving data from single parcels corresponding to entries 132 of the one of fragment tables 104 and/or retrieving data from single parcels corresponding to entries of a parcel table, such as entries 134 of parcel table 106. The data retrieval may be performed consecutively for each entry of the corresponding one of fragment tables 104, such that the data for the fragments is retrieved in order, thereby achieving inline packet reassembly. In other words, SGW 22B need not determine the relative ordering of the packet fragments, because the nature in which the packet fragments are stored allows the packet fragments to be retrieved in order and concatenated, which allows the corresponding packet to be reconstructed in order.

In some examples, reassembling the packet includes additional processing of the data for the packets. For example, the fragments may form an encapsulated packet. That is, the data for the fragments may form a packet having a header, such as one or more labels of a multiprotocol label switching (MPLS) label stack. In some examples, SGW 22B decapsulates such an encapsulated packet, e.g., by removing the labels of the label stack. SGW 22B may also process the reassembled packet to, e.g., to determine an associated customer for billing purposes, perform traffic management, monitor network status, provide one or more services (such as intrusion detection or malware detection), or other such processes. Furthermore, SGW 22B outputs the reassembled packet (149).

As explained above, the method of FIG. 5 may be performed by a hardware-based processing element of a forwarding unit of an SGW device. For example, the method of FIG. 5 may be performed by one of packet processors 48, packet processor 48, or packet reassembly logic 86 (FIG. 3). The method of FIG. 5 represents an example of a method including receiving, by an SGW device, a packet fragment from a packet data network gateway (PGW) device, hashing a source Internet protocol (IP) address, a destination IP address, and a fragment identifier value for the packet fragment to determine an entry of a hash table, wherein the entry of the hash table includes data defining a next expected offset, a next expected fragment identifier, and a reference to a fragment table comprising data for at least one previous packet fragment corresponding to the packet fragment, comparing a length of the packet fragment to the next expected offset and comparing the fragment identifier value for the packet fragment to the next expected fragment identifier, and storing the packet fragment using the fragment table based on the comparisons.

Figure 6:
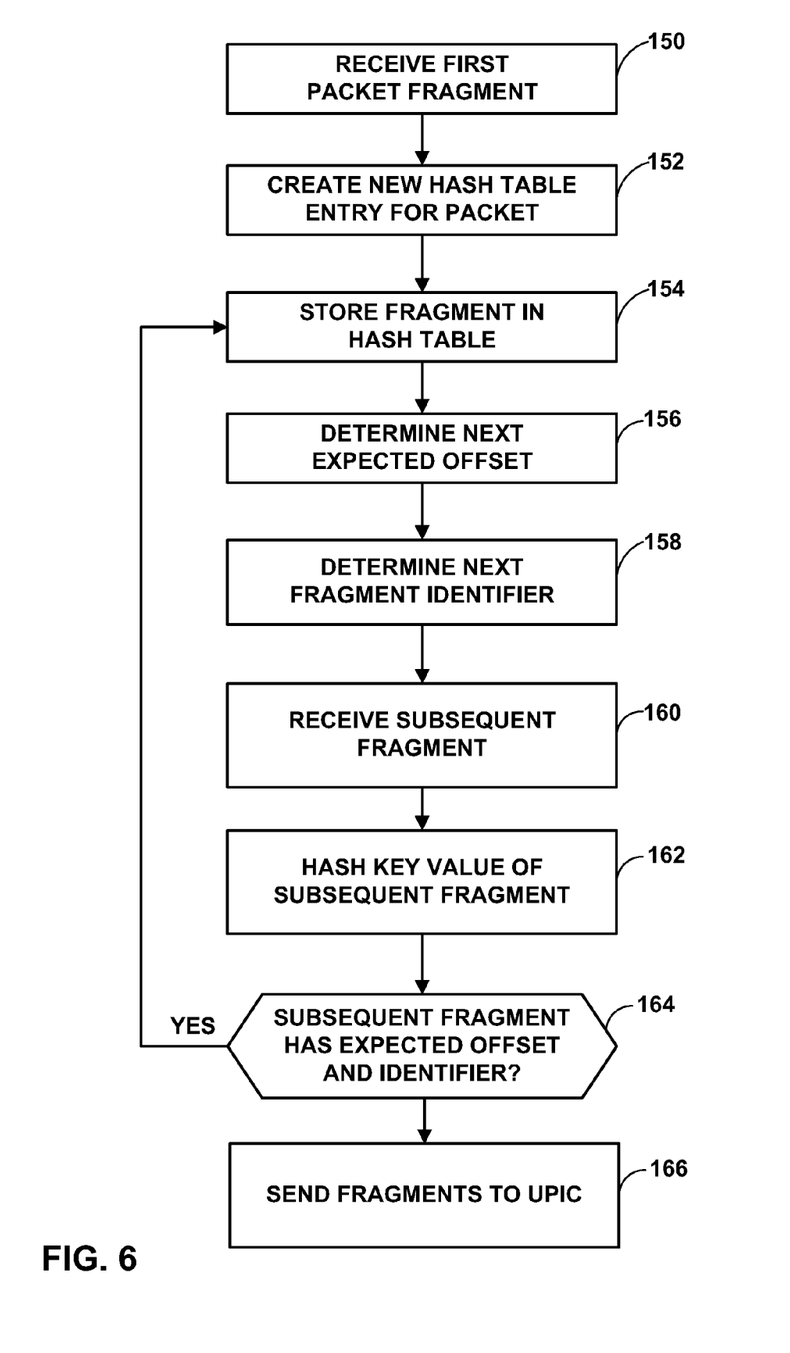
FIG. 6 is a flowchart illustrating another example method for performing in-line packet reassembly.

FIG. 6 is a flowchart illustrating an example method for performing in-line packet reassembly. The example method of FIG. 6 is described with respect to the devices of FIG. 1 for purposes of illustration, although it should be understood that other devices and components may be configured to perform this or similar methods. The method of FIG. 6 may generally correspond to steps 140-146 of the method of FIG. 5. In this example, initially, SGW 22B receives a first packet fragment, e.g., packet fragment 17A (150). SGW 22B creates a new hash table entry for a packet corresponding to the packet fragment (152). That is, SGW 22B executes a hash function on a hash key for the packet fragment, such as a source IP address, destination IP address, and IP identifier. The output of the hash function corresponds to one of entries 122 of IP fragment hash table 112.

Assuming that the one of entries 122 of IP fragment hash table 112 is available, SGW 22B stores the packet fragment in the hash table (154), in the one of entries 122 of IP fragment hash table 112. In cases where the one of entries 122 is not available, a service unit of SGW 22B (similar to service unit 40 of SGW 80) may perform packet reassembly for the packet corresponding to the fragment. After SGW 22B stores the packet fragment in the hash table, SGW 22B determines a next expected offset value (156) based on the length (e.g., in bytes) of packet fragment 17A. SGW 22B also determines a next fragment identifier (158), e.g., as the value of the identifier for packet fragment 17A plus one.

Next, SGW 22B receives a subsequent fragment (160), e.g., packet fragment 17B. SGW 22B may then hash a key value of the subsequent fragment (162), where the key value may comprise a source IP address, destination IP address, and fragment identifier value. If the subsequent fragment is hashed to a valid one of entries 122 of IP fragment hash table 112, SGW 22B may determine whether the subsequent fragment has the expected offset and identifier (164). In particular, the key value is expected to be hashed to the same one of entries 122 as packet fragment 17A, in this example. To determine whether the subsequent packet has an expected offset, SGW 22B compares the offset for packet fragment 17B to the next expected offset data stored in the one of entries 122 to which the key value for the subsequent packet fragment is hashed. To determine whether the subsequent packet has an expected identifier, SGW 22B compares the fragment identifier for packet fragment 17B to the next fragment identifier data stored in the one of entries 122 to which the key value for the subsequent packet fragment is hashed.

If the subsequent packet has the expected offset and identifier ("YES" branch of 164), SGW 22B stores the fragment in the hash table (154), and again determines the next expected offset (156) and expected fragment identifier (158). However, if the subsequent fragment is not hashed to a valid entry or if the subsequent fragment does not have the expected fragment identifier value or offset value ("NO" branch of 164), SGW 22B sends the fragments to the service unit of SGW 22B (166). After storing all packet fragments for a particular packet in the hash table, SGW 22B outputs the reconstructed packet, e.g., toward a corresponding mobile device via an eNodeB base station.

In this manner, the method of FIG. 6 represents an example of a method including receiving, by a serving gateway (SGW) device, a packet fragment from a packet data network gateway (PGW) device, hashing a source Internet protocol (IP) address, a destination IP address, and a fragment identifier value for the packet fragment to determine an entry of a hash table. The entry of the hash table includes data defining a next expected offset, a next expected fragment identifier, and a reference to a fragment table comprising data for at least one previous packet fragment corresponding to the packet fragment. The method further includes comparing a length of the packet fragment to the next expected offset and comparing the fragment identifier value for the packet fragment to the next expected fragment identifier, and storing the packet fragment using the fragment table based on the comparisons.

The method may be performed by one or more hardware elements of SGWs 22, 80. Storing the packet fragments in this manner may achieve inline packet reassembly, in that contiguous entries in the fragment table may correspond to contiguous packet fragments for a common packet. Thus, to reassemble the packet, the SGW device may retrieve data for the packet fragments from locations corresponding to entries of the fragment table in an order defined according to the order of the entries of the fragment table. Furthermore, the SGW device may reassemble a plurality of packets in this manner substantially in parallel, as hashing the key values for the packet fragments causes the packet fragments for a common packet to be directed to a common fragment table.

Although generally described with respect to IP packet reassembly in a serving gateway device, the techniques of this disclosure may be performed by other devices and may be applicable in other scenarios as well. For example, the techniques of this disclosure may be implemented by a device configured to perform the Layer-2 Tunneling Protocol (L2TP). In L2TP, packets are encapsulated between two node devices: an L2TP Network Server (LNS) and an L2TP Access Controller (LAC). The encapsulated packets may be fragmented, and thus, may be reassembled using the techniques of this disclosure. Either or both of an LNS and a LAC may implement the techniques of this disclosure for reassembling fragmented packets.

As another example, in generic routing encapsulation (GRE), encapsulated packets may be fragmented. Thus, devices configured to participate in a GRE session may also be configured to perform the techniques of this disclosure to reassemble fragmented packets encapsulated in accordance with GRE or other encapsulation and/or tunneling protocols, such as multiprotocol label switching (MPLS). The techniques of this disclosure may further be applicable to any other protocol in which packets become fragmented and need to be reassembled.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure. In general, the in line packet reassembly techniques of this disclosure are performed in hardware, while packet reassembly performed in the control plane (e.g., by a service unit in the control plane) may be performed in software, hardware, or a combination thereof.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media. In this manner, instructions for one or more software programs or modules may be stored on a non-transitory, computer-readable storage medium. The instructions may be executed by one or more hardware-based processors or hardware-based processing units.

Various examples have been described. These and other examples are within the scope of the following claims.

What is claimed is:

1. A method comprising:
 receiving, by a first network device, a packet fragment from a second network device;
 hashing a source Internet protocol (IP) address, a destination IP address, and a fragment identifier value for the packet fragment to determine an entry of a hash table, wherein the entry of the hash table includes data defining a next expected offset, a next expected fragment identifier, and a reference to a fragment table comprising data for at least one previous packet fragment corresponding to the packet fragment;
 comparing a length of the packet fragment to the next expected offset and comparing the fragment identifier value for the packet fragment to the next expected fragment identifier; and
 storing the packet fragment using the fragment table based on the comparisons.

2. The method of claim 1, further comprising:
 determining whether the packet fragment is an ordinal-first packet fragment of a packet; and
 comparing the length and the fragment identifier when the packet fragment is not the ordinal-first packet fragment of the packet.

3. The method of claim 1, wherein storing the packet fragment based on the comparisons comprises storing the packet fragment when the length of the packet fragment corresponds to the next expected offset and when the fragment identifier value for the packet fragment corresponds to the next expected fragment identifier.

4. The method of claim 1, further comprising, after storing all packet fragments for a packet to the fragment table:
   reassembling the packet from the stored packet fragments; and
   outputting the reassembled packet.

5. The method of claim 4, wherein reassembling the packet comprises reassembling the packet as part of an inline reassembly process.

6. The method of claim 4, wherein reassembling the packet comprises:
   forming an encapsulated packet from the packet fragments; and
   decapsulating the encapsulated packet to produce an inner Internet protocol (IP) packet, wherein the inner IP packet comprises the reassembled packet.

7. The method of claim 4, wherein outputting the reassembled packet comprises forwarding the reassembled packet to an eNodeB base station.

8. The method of claim 1, further comprising reassembling a packet including the packet fragment by a service unit operating in a control plane of the first network device when the comparisons indicate that at least one of the length of the packet fragment does not correspond to the next expected offset and the fragment identifier value does not correspond to the next expected fragment identifier.

9. The method of claim 1, wherein storing the packet fragment using the fragment table comprises storing the packet fragment in a memory address identified by an entry of the fragment table.

10. The method of claim 1, wherein receiving comprises receiving by a hardware-based processing element of a forwarding unit of the first network device, wherein hashing comprises hashing by the hardware-based processing element of the forwarding unit of the first network device, wherein comparing comprises comparing by the hardware-based processing element of the forwarding unit of the first network device, and wherein storing comprises by the hardware-based processing element of the forwarding unit of the first network device.

11. The method of claim 1, wherein the first network device comprises a serving gateway (SGW) device, and wherein the second network device comprises a packet data network gateway (PGW) device.

12. The method of claim 1, wherein the first network device comprises at least one of a Layer-2 Tunneling Protocol (L2TP) Access Controller (LAC) and a L2TP Network Server (LNS).

13. The method of claim 1, wherein receiving the packet fragment comprises receiving a generic routing encapsulation (GRE) encapsulated packet fragment.

14. A network device comprising:
   one or more network interfaces configured to receive a packet fragment from a second network device; and
   a control unit configured to hash a source Internet protocol (IP) address, a destination IP address, and a fragment identifier value for the packet fragment to determine an entry of a hash table, wherein the entry of the hash table includes data defining a next expected offset, a next expected fragment identifier, and a reference to a fragment table comprising data for at least one previous packet fragment corresponding to the packet fragment, to compare a length of the packet fragment to the next expected offset and to compare the fragment identifier value for the packet fragment to the next expected fragment identifier, and store the packet fragment using the fragment table based on the comparisons.

15. The device of claim 14, wherein the control unit is further configured to determine whether the packet fragment is an ordinal-first packet fragment of a packet, and to compare the length and the fragment identifier when the packet fragment is not the ordinal-first packet fragment of the packet.

16. The device of claim 14, wherein to store the packet fragment based on the comparison, the control unit is configured to store the packet fragment when the length of the packet fragment corresponds to the next expected offset and when the fragment identifier value for the packet fragment corresponds to the next expected fragment identifier.

17. The device of claim 14, wherein the control unit is further configured to, after storing all packet fragments for a packet to the fragment table, reassemble a packet from the stored packet fragments, and output the reassembled packet.

18. The device of claim 14, further comprising a service unit operating in a control plane of the device, wherein the service unit is configured to reassemble a packet including the packet fragment when the comparisons indicate that at least one of the length of the packet fragment does not correspond to the next expected offset and the fragment identifier value does not correspond to the next expected fragment identifier.

19. The device of claim 14, wherein the device comprises a forwarding unit, and wherein the forwarding unit comprises the control unit.

20. The device of claim 14, wherein the network device comprises one of a serving gateway (SGW) device, a Layer-2 Tunneling Protocol (L2TP) Access Controller (LAC), and a L2TP Network Server (LNS).

21. A non-transitory computer-readable storage medium comprising instructions that, when executed, cause a processor of a network device to:
   receive a packet fragment from a second network device;
   hash a source Internet protocol (IP) address, a destination IP address, and a fragment identifier value for the packet fragment to determine an entry of a hash table, wherein the entry of the hash table includes data defining a next expected offset, a next expected fragment identifier, and a reference to a fragment table comprising data for at least one previous packet fragment corresponding to the packet fragment;
   compare a length of the packet fragment to the next expected offset and compare the fragment identifier value for the packet fragment to the next expected fragment identifier; and
   store the packet fragment using the fragment table based on the comparisons.

22. The computer-readable storage medium of claim 21, further comprising instructions that cause the processor to:
   determine whether the packet fragment is an ordinal-first packet fragment of a packet; and
   compare the length and the fragment identifier when the packet fragment is not an ordinal-first packet fragment of a packet.

23. The computer-readable storage medium of claim 21, wherein the instructions that cause the processor to store the packet fragment based on the comparison comprise instructions that cause the processor to store the packet fragment when the length of the packet fragment corresponds to the next expected offset and when the fragment identifier value for the packet fragment corresponds to the next expected fragment identifier.

24. The computer-readable storage medium of claim 21, further comprising instructions that cause the processor to, after storing all packet fragments for a packet to the fragment table:
   reassemble a packet from the stored packet fragments; and
   output the reassembled packet.

25. The computer-readable storage medium of claim 21, further comprising instructions that cause the processor to reassemble a packet including the packet fragment by a service unit of the network device when the comparisons indicate that at least one of the length of the packet fragment does not correspond to the next expected offset and the fragment identifier value does not correspond to the next expected fragment identifier.

26. A system comprising:
a first network device; and
a second network device communicatively coupled to the first device via a communicative interface,
wherein the first network device is configured to fragment a packet when the packet would exceed a maximum transmission unit size associated with the communicative interface, and
wherein the second network device is configured to receive a packet fragment from the first device, hash a source Internet protocol (IP) address, a destination IP address, and a fragment identifier value for the packet fragment to determine an entry of a hash table, wherein the entry of the hash table includes data defining a next expected offset, a next expected fragment identifier, and a reference to a fragment table comprising data for at least one previous packet fragment corresponding to the packet fragment, compare a length of the packet fragment to the next expected offset and compare the fragment identifier value for the packet fragment to the next expected fragment identifier, and store the packet fragment using the fragment table based on the comparisons.

27. The system of claim 26, wherein the second network device is further configured to determine whether the packet fragment is an ordinal-first packet fragment of a packet, and to compare the length and the fragment identifier when the packet fragment is not the ordinal-first packet fragment of the packet.

28. The system of claim 26, wherein to store the packet fragment based on the comparisons, the second network device is configured to store the packet fragment when the length of the packet fragment corresponds to the next expected offset and when the fragment identifier value for the packet fragment corresponds to the next expected fragment identifier.

29. The system of claim 26, wherein the second network device is further configured to, after storing all packet fragments for a packet to the fragment table, reassemble a packet from the stored packet fragments, and output the reassembled packet.

30. The system of claim 26, wherein the second network device comprises a service unit, and wherein the second network device is further configured to reassemble a packet including the packet fragment using the service unit when at least one of the comparison indicates that the length of the packet fragment does not correspond to the next expected offset and the fragment identifier value does not correspond to the next expected fragment identifier.

31. The system of claim 26, wherein the first network device comprises a packet data network gateway (PGW) device, and wherein the second network device comprises a serving gateway (SGW) device.

32. The system of claim 26, wherein the first network device comprises a Layer-2 Tunneling Protocol (L2TP) Access Controller (LAC), and wherein the second network device comprises a L2TP Network Server (LNS).

33. The system of claim 26, wherein the second network device comprises a Layer-2 Tunneling Protocol (L2TP) Access Controller (LAC), and wherein the first network device comprises a L2TP Network Server (LNS).

34. The system of claim 26, wherein the first network device is configured to encapsulate the packet fragments using generic routing encapsulation (GRE), and wherein the second network device is configured to decapsulate the packet fragments using GRE.

\* \* \* \* \*